United States Patent
Kamuf et al.

(10) Patent No.: US 8,331,254 B2
(45) Date of Patent: Dec. 11, 2012

(54) INTERFERENCE-AWARE RESOURCE ASSIGNMENT IN COMMUNICATION SYSTEMS

(75) Inventors: Matthias Kamuf, Lund (SE); Christian Bergljung, Lund (SE); Fredrik Nordström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 389 days.

(21) Appl. No.: 12/642,027

(22) Filed: Dec. 18, 2009

(65) Prior Publication Data

US 2011/0026415 A1 Feb. 3, 2011

Related U.S. Application Data

(60) Provisional application No. 61/229,443, filed on Jul. 29, 2009.

(51) Int. Cl.
*H04J 1/16* (2006.01)
*H04J 1/00* (2006.01)
*H04J 3/16* (2006.01)

(52) U.S. Cl. ............... 370/252; 370/343; 370/465

(58) Field of Classification Search ........... 370/252, 370/281, 319, 343, 344, 465
See application file for complete search history.

(56) References Cited

U.S. PATENT DOCUMENTS

| | | | |
|---|---|---|---|
| 2003/0016649 A1* | 1/2003 | Connors | 370/347 |
| 2004/0264393 A1* | 12/2004 | Desgagne et al. | 370/294 |
| 2005/0018656 A1* | 1/2005 | Rudolf et al. | 370/352 |
| 2005/0118962 A1* | 6/2005 | Sheiman | 455/78 |
| 2007/0049219 A1* | 3/2007 | Demir et al. | 455/126 |
| 2007/0173260 A1 | 7/2007 | Love et al. | |
| 2008/0096574 A1 | 4/2008 | Khandekar et al. | |
| 2008/0212697 A1 | 9/2008 | Wilhelmsson | |
| 2008/0279125 A1* | 11/2008 | Hottinen | 370/281 |
| 2009/0116473 A1 | 5/2009 | Lindoff et al. | |
| 2009/0154577 A1 | 6/2009 | Lindoff et al. | |
| 2009/0213766 A1* | 8/2009 | Chindapol et al. | 370/278 |
| 2009/0230414 A1* | 9/2009 | Galvez | 257/98 |
| 2009/0247181 A1* | 10/2009 | Palanki et al. | 455/452.2 |
| 2010/0034303 A1* | 2/2010 | Damnjanovic et al. | 375/260 |
| 2010/0226290 A1* | 9/2010 | Kwak et al. | 370/278 |
| 2011/0019597 A1* | 1/2011 | Moon et al. | 370/281 |

FOREIGN PATENT DOCUMENTS

WO 2007/096683 A1 8/2007

OTHER PUBLICATIONS

EPO, Int'l Search Rpt in PCT/EP2010/060799, Nov. 9, 2010.
EPO, Written Opinion in PCT/EP2010/060799, Nov. 9, 2010.
Mitsubishi Electric, Impact of Scalable Bandwidth and Multiple Camping Positions on Modulation Parameters, R1-061705, 3GPP TSG RAN WG1 Ad Hoc Meeting, Jun. 27, 2006, Cannes, FR.
Motorola, Impact of UE Self-Interference on LTE FD-FDD Operation (Band 12), R4-081110, 3GPP TSG RAN WG4 Meeting 47, May 5, 2008, Kansas City, MO, USA.
Huawei, MIMO Impact on MSD in LTE-A, R4-100142, 3GPP TSG RAN WG4 Ad Hoc Meeting, Jan. 18, 2010, Sophia Antipolis, FR.

* cited by examiner

*Primary Examiner* — Andrew Lee
(74) *Attorney, Agent, or Firm* — Potomac Patent Group PLLC (57) ABSTRACT

Methods and apparatus in a frequency division duplex, orthogonal frequency division multiplex communication system assign resources, including the number, frequency position, and coding, in a subframe of a downlink to a user equipment (UE) based on parameters that influence the robustness against UE self-induced interference when the UE is scheduled for uplink transmission in that subframe.

15 Claims, 6 Drawing Sheets

INTERFERENCE-AWARE RESOURCE ASSIGNMENT IN COMMUNICATION SYSTEMS

CROSS-REFERENCE TO RELATED APPLICATION

This application claims the benefit of the filing date of U.S. Provisional Patent Application No. 61/229,443 filed on Jul. 29, 2009, which is incorporated here by reference.

TECHNICAL FIELD

This invention relates to radio communication systems and more particularly to scheduling transmissions in such systems.

BACKGROUND

In forthcoming evolutions of cellular radio communication systems, such as Long Term Evolution (LTE) and High-Speed Packet Access (HSPA), the maximum throughput, or data rate, will be higher than in previous systems. Higher throughputs typically require larger system channel bandwidths.

LTE and HSPA are sometimes called "third generation" communication systems and are currently being standardized by the Third Generation Partnership Project (3GPP). The LTE specifications can be seen as an evolution of the current wideband code division multiple access (WCDMA) specifications. An IMT advanced communication system uses an internet protocol (IP) multimedia subsystem (IMS) of an LTE, HSPA, or other communication system for IMS multimedia telephony (IMT). In the IMT advanced system (i.e., a "fourth generation" (4G) mobile communication system), bandwidths of 100 megahertz (MHz) and larger are being considered. The 3GPP promulgates the LTE, HSPA, WCDMA, and IMT specifications, and specifications that standardize other kinds of cellular wireless communication systems.

An LTE system uses orthogonal frequency division multiplex (OFDM) as a multiple access technique (called OFDMA) in the downlink (DL) from system nodes to user equipments (UEs). An LTE system has channel bandwidths ranging from about 1.4 MHz to 20 MHz, and supports throughputs of more than 100 megabits per second (Mb/s) on the largest-bandwidth channels. One type of physical channel defined for the LTE downlink is the physical downlink shared channel (PDSCH), which conveys information from higher layers in the LTE protocol stack and to which one or more specific transport channels are mapped. Control information is conveyed by a physical uplink control channel (PUCCH) and by a physical downlink control channel (PDCCH). LTE channels are described in 3GPP Technical Specification (TS) 36.211 V8.4.0, Physical Channels and Modulation (Release 8) (September 2008), among other specifications.

In an OFDMA communication system like LTE, the data stream to be transmitted in the downlink is portioned among a number of narrowband subcarriers that are transmitted in parallel. In general, a resource block (RB) devoted to a particular UE is a particular number of particular subcarriers used for a particular period of time. An RB is made up of resource elements (REs), each of which is a particular subcarrier used for a smaller period of time. Different groups of subcarriers can be used at different times for different users. Because each subcarrier is narrowband, each subcarrier experiences mainly flat fading, which makes it easier for a UE to demodulate each subcarrier.

Like many modern communication systems, DL transmissions in an LTE system are organized into frames of 10 milliseconds (ms) duration, each frame includes twenty successive time slots, and a subframe includes two successive time slots. OFDMA communication systems are described in the literature, for example, U.S. Patent Application Publication No. US 2008/0031368 A1 by B. Lindoff et al.

Figure 1:
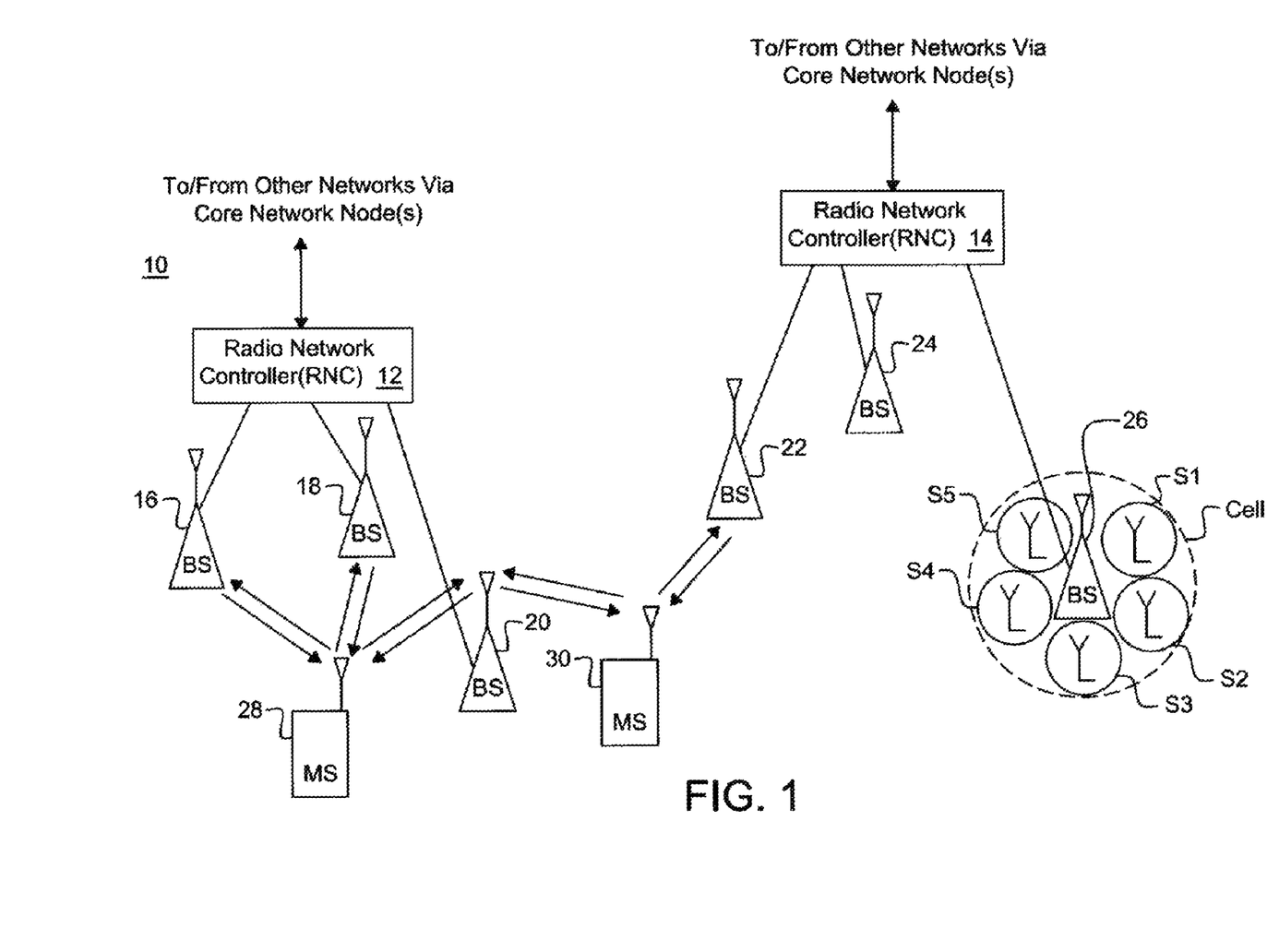
FIG. 1 depicts a cellular communication system.

FIG. 1 depicts a typical cellular communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and uplink (UL, or reverse) channels. In FIG. 1, RNC 12 is shown coupled to BSs 16, 18, 20, and RNC 14 is shown coupled to BSs 22, 24, 26.

Each BS, or eNodeB in LTE vocabulary, serves a geographical area that is divided into one or more cell(s). In FIG. 1, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 1 can be modified in LTE and other communication systems. For example, the functionality of the RNCs 12, 14 can be moved to the eNodeBs 22, 24, 26, and other functionalities can be moved to other nodes in the network. It will also be understood that a base station can use multiple transmit antennas to transmit information into a cell/sector/area, and those different transmit antennas can send respective, different pilot signals.

Fast and efficient cell searches and received signal measurements are important for a UE to get and stay connected to a suitable cell, which can be called a "serving cell". On a regular basis, a UE measures its received signal strength and signal quality of each cell it detects, including its serving cell, to determine whether a new serving cell should be selected. The new cell can be on the same frequency as a current cell or on a different frequency. The UE measures a reference signal received power (RSRP), which can be defined as the average UE-received signal power of reference symbols (RS) transmitted by an eNodeB, on its serving cell as well as on neighboring cells that the UE has detected as a result of a cell search procedure, as specified for example in Section 5.2 of 3GPP TS 36.304 V8.4.0, User Equipment (UE) Procedures in Idle Mode (Release 8) (December 2008). The eNodeBs control the transmit power levels of the UEs by sending them respective control commands, and from time to time, the UEs can send reports of its perceived channel quality and other signal parameters to one or more eNodeBs.

Figure 2:
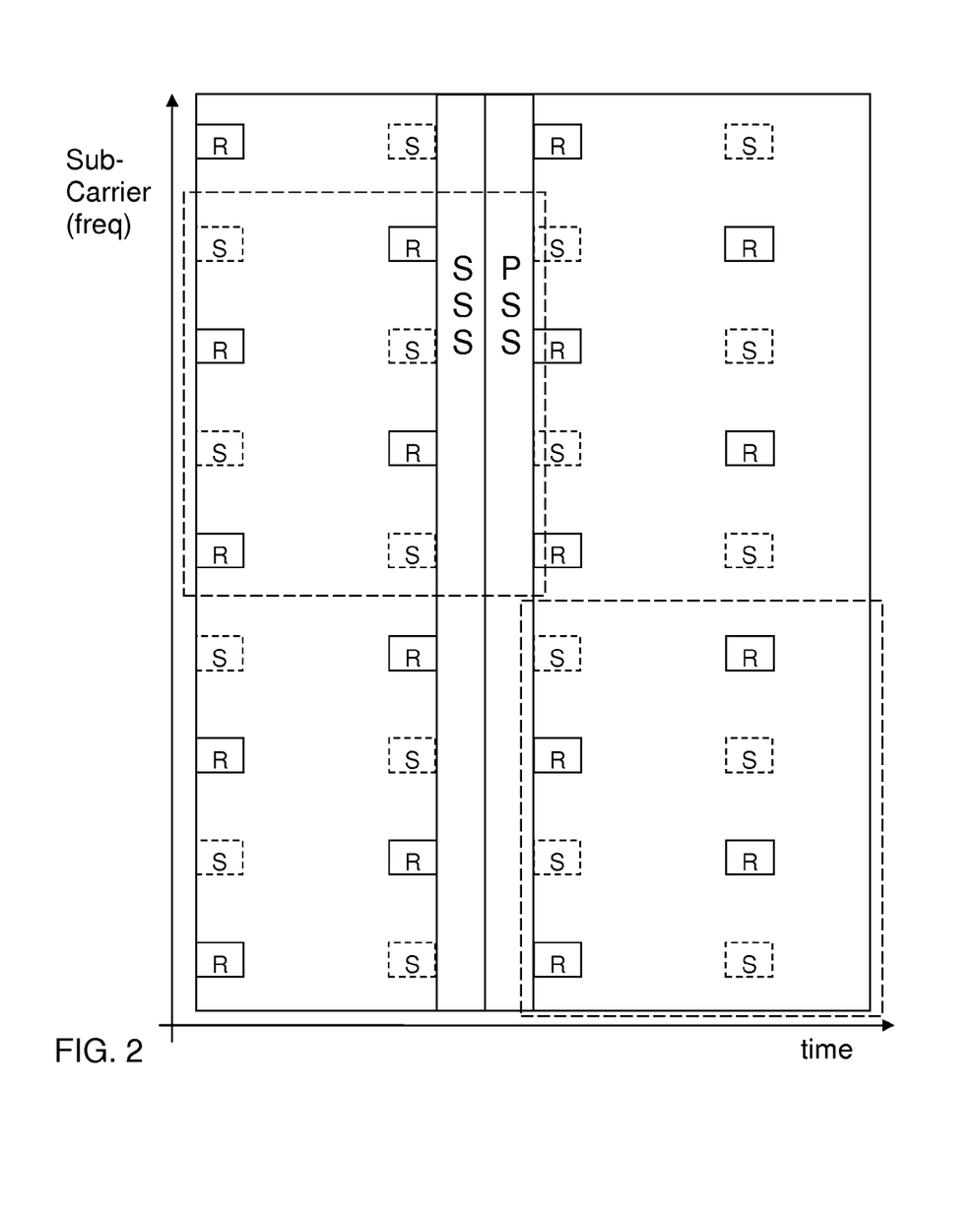
FIG. 2 depicts reference, primary synchronization, and secondary synchronization symbols in a communication system that uses orthogonal frequency division multiple access.

FIG. 2 shows an arrangement of subcarriers in resource blocks in a subframe in an LTE system. The frequency range depicted in FIG. 2 includes twenty-seven subcarriers, only nine of which are explicitly indicated. In FIG. 2, the RBs, which are indicated by dashed lines, each include twelve subcarriers spaced apart by fifteen kilohertz (kHz), which together occupy 180 kHz in frequency and 0.5 ms in time, or one time slot. In an LTE system, an RB spans either twelve subcarriers with a subcarrier bandwidth of 15 kHz or twentyfour subcarriers with a subcarrier bandwidth of 7.5 kHz, each over a slot duration of 0.5 ms. FIG. 2 shows each time slot including seven OFDM symbols, or REs, each of which has a short (normal) cyclic prefix, although six OFDM symbols having long (extended) cyclic prefixes can be used instead in a time slot. It will be understood that RBs can include various numbers of subcarriers for various periods of time.

RS transmitted by a first transmit (TX) antenna of an eNodeB are denoted R and by a possible second TX antenna in the node are denoted by S. In FIG. 2, RS are depicted as transmitted on every sixth subcarrier in OFDM symbol 0 and OFDM symbol 4 (because the symbols have short cyclic prefixes) in every slot. Also in FIG. 2, the RSs in symbols 4 are offset by three subcarriers relative to the RS in OFDM symbol 0, the first OFDM symbol in a slot.

Besides reference signals, predetermined synchronization signals are transmitted in LTE in a hierarchical cell search scheme, similar to WCDMA, in which synchronization acquisition and cell group identifier are obtained from different synchronization channel (SCH) signals. Thus, a primary synchronization channel (P-SCH) signal and a secondary synchronization channel (S-SCH) signal are defined with a pre-defined structure in Section 6.11 of 3GPP TS 36.211. For example, P-SCH and S-SCH signals can be transmitted on particular subcarriers in particular time slots. In an LTE system, the eNodeBs transmit two different synchronization signals: a primary synchronization signal (PSS) and a secondary synchronization signal (SSS). Primary and secondary synchronization signals are described in U.S. Patent Application Publication No. US 2008/0267303 A1 by R. Baldemair et al. FIG. 2 shows the SSS and PSS as OFDM symbols 5, 6 (assuming operation with the short cyclic prefix and frequency-division duplex (FDD). Current LTE systems have the PSS and SSS symbols transmitted in the middle six resource blocks in subframes 0 and 5.

With FDD in a system like LTE, DL and UL data transmissions are scheduled independently of each other, and so at some times there is only DL transmission, at other times there is only UL transmission, and at still other times there are both DL and UL transmissions at the same time. UL-DL frame timing is specified in Section 8 of 3GPP TS 36.211.

Figure 3:
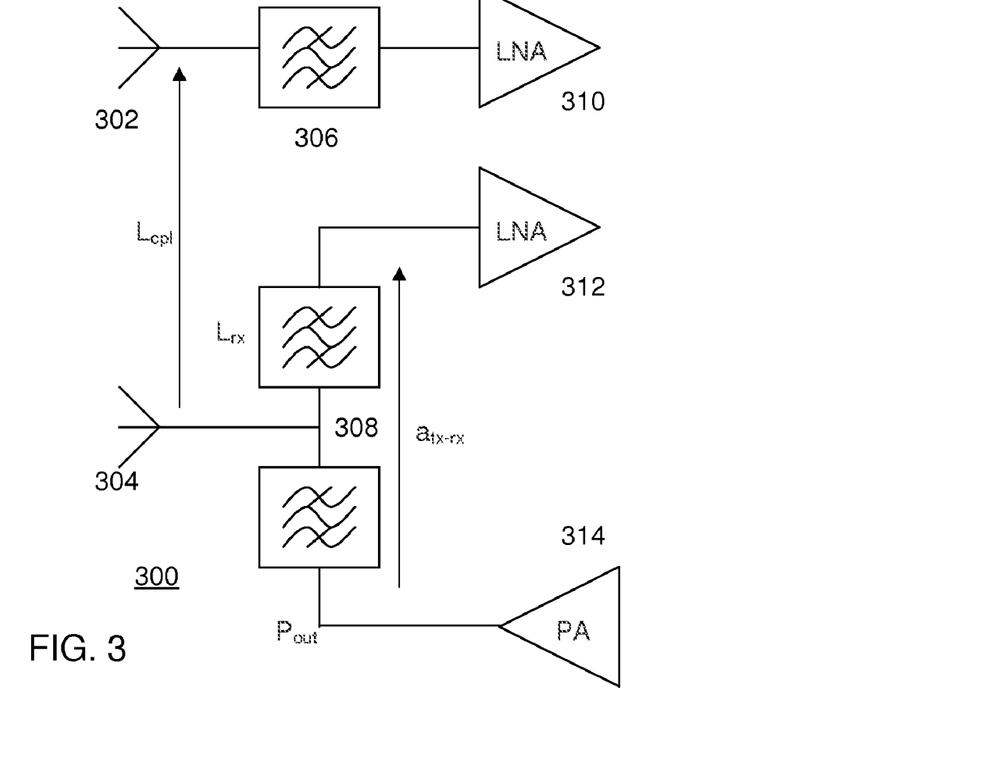
FIG. 3 is a block diagram of a portion of a diversity receiver for a frequency-division-duplex communication system.

Although LTE and other UEs are often said to use one transmit and two receive antennas, it is usually the case today that the UE has only two physical antennas. As a result, the transmit path and one of the receive paths share the same antenna, as shown in FIG. 3, which is a block diagram of a portion of a UE 300 for an FDD system. The UE 300 includes a first antenna 302 and a second antenna 304, a bandpass filter 306, a duplex bandpass filter 308, two low-noise amplifiers (LNAs) 310, 312, and a power amplifier (PA) 314. As depicted, the UE 300 includes a diversity receiver that has two receive paths, a first path that includes the antenna 302, filter 306, and LNA 310, and a second path that includes the antenna 304, duplex filter 308, and LNA 312. The UE 300 also includes a transmit path that includes the PA 314, duplex filter 308, and antenna 304. The minimum requirements for the receiver's reference sensitivity (REFSENS) are specified in Section 7.3 of 3GPP TS 36.101 V8.3.0, E-UTRA UE Radio Transmission and Reception (Release 8) (September 2009), which basically specifies the noise factor of the receiver.

In the UE 300, leakage between the UL (transmit) and the DL (receive) paths when the UE is scheduled for both DL and UL data in the same subframe results in noise components around zero frequency (d.c.) in the spectra of demodulated DL subcarriers. Leakage can arise, for example, from inductive coupling $L_{cpl}$ between the antennas 302, 304 and from inductive coupling $L_{rx}$ and resistive coupling $a_{tx-rx}$ between the portions of the duplex filter 308. In general, the noise spectrum is symmetric around zero frequency and has a bandwidth that is twice as large as the bandwidth for UL transmission. In effect, leakage raises the noise floor for affected subcarriers, which degrades the overall DL demodulation performance. Such noise components constitute leakage-induced interference with the received signal and are due mainly to second-order non-linearity products.

Second-order non-linearity in the RF or baseband components squares the (modulated) transmit leakage signal, producing d.c. and modulated components around d.c. in the receive bandwidth of a direct-conversion receiver. The modulated part appears with twice the bandwidth because of the squaring (i.e., convolution in the frequency domain). Other effects can also arise, such as self-mixing, where the strong leaking transmit signal couples to the UL mixer's input port and is multiplied with itself, that produce modulated signals of twice the transmit bandwidth around d.c. in the receive bandwidth. The aim of the so-called duplex filter 308 is to prevent noticeable leakage of the transmit signal into at least the in-band portion of the receive path spectrum, which is not easy due to the need for a sensitive receiver.

The scheduling of DL and UL frames, which is currently done in the eNodeB, does not take such UE-specific interference into account, which can lead to UE demodulation performance degradation. Therefore, there is a need for improved methods and apparatus of DL/UL scheduling that are aware of UE-specific interference.

SUMMARY

In accordance with aspects of this invention, there is provided a method in a frequency division duplex communication system of assigning resources in a DL to a UE. The method includes determining at least one parameter for a DL resource assignment, wherein the at least one parameter is at least one of an UL allocation bandwidth, an UL transmit power, a DL allocation bandwidth, and an initial modulation and coding scheme (MCS); and basing the DL resource assignment on the determined at least one parameter such that DL-scheduled resource blocks are not spectrally within zero frequency plus or minus a bandwidth of a scheduled UL transmission.

Also in accordance with aspects of this invention, there is provided an apparatus in a frequency division duplex communication system for assigning resources in a DL to a UE. The apparatus includes an electronic processor configured to determine at least one parameter for a DL resource assignment and to base the DL resource assignment on the determined at least one parameter such that DL-scheduled resource blocks are not spectrally within zero frequency plus or minus a bandwidth of a scheduled UL transmission. The at least one parameter is at least one of an UL allocation bandwidth, an UL transmit power, a DL allocation bandwidth, and an initial MCS.

Also in accordance with this invention, there is provided a computer-readable medium having stored instructions that, when executed by a computer, cause the computer to perform a method in a frequency division duplex communication system of assigning resources in a DL to a UE. The method includes determining at least one parameter for a DL resource assignment, wherein the at least one parameter is at least one of an UL allocation bandwidth, an UL transmit power, a DL allocation bandwidth, and an initial MCS; and basing the DL resource assignment on the determined at least one parameter such that DL-scheduled resource blocks are not spectrally within zero frequency plus or minus a bandwidth of a scheduled UL transmission.

BRIEF DESCRIPTION OF THE DRAWINGS

The several features, objects, and advantages of this invention will be understood by reading this description in conjunction with the drawings, in which.

DETAILED DESCRIPTION

This description focuses on an LTE communication system for efficient explanation, but the artisan will understand that the invention in general can be implemented in other communication systems.

In an LTE communication system, scheduling is specified in Section 11 of 3GPP TS 36.300 V8.6.0, E-UTRAN Overall Description, Stage 2 (Release 8) (September 2008). In general, each eNodeB implements a medium access control (MAC) functionality that includes dynamic resource schedulers that allocate physical layer resources for DL and UL channels. Different schedulers operate for the DL and UL, and take into account traffic volume and quality-of-service (QoS) requirements of each UE and associated radio bearers. Schedulers may also take account the radio conditions at the UE as determined from measurements made by the eNodeB or made and reported by the UE. Resource assignment includes physical resource blocks (PRB) and modulation coding scheme (MCS). A UE can monitor the PDCCH in order to find possible DL and UL allocations.

The inventors have recognized that the size (e.g., number of RBs), position, and MCS in a subframe of a DL assignment for a UE should be based on parameters that influence the robustness against UE self-induced interference when the UE is scheduled for UL transmission in that subframe. As for the UL, interference from an UL assignment is always around d.c., but more RBs can be assigned to decrease the power spectral density, which would produce less interference, or the UL can be scheduled in a different subframe. Accordingly, the conventional resource assignment specified by 3GPP TS 36.300 is modified such that at least one of the following parameters is taken into account when scheduling UEs in the DL, with respect to both position of RBs and choice of MCS: UL allocation bandwidth, UL transmit power, DL allocation bandwidth, and initial MCS (e.g., based on reports of channel quality indicator (CQI) only).

Figure 4A:
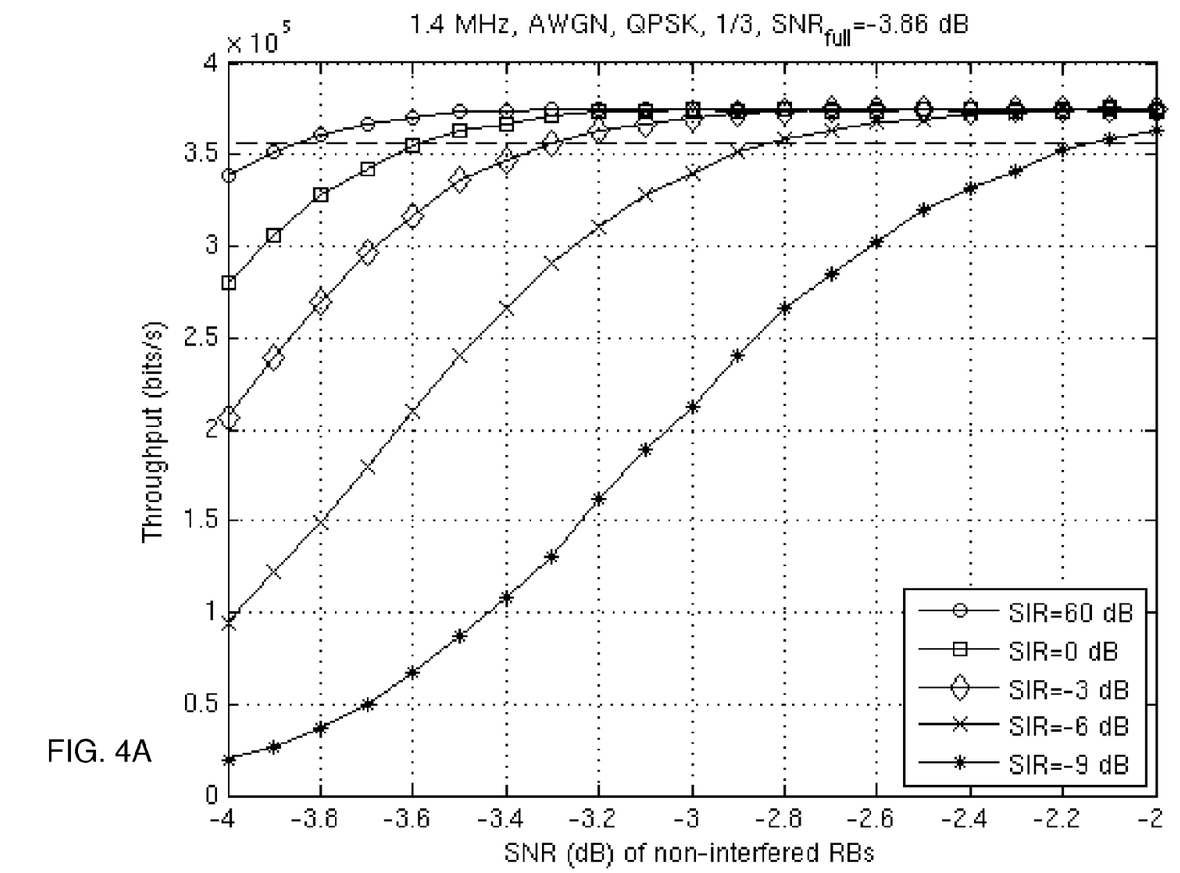
FIGS. 4A, 4B are plots of simulated throughput against signal-to-noise ratio.

FIG. 4A is a plot of simulated throughput against signal-to-noise ratio (SNR) that shows the effect in a UE of leakage-induced interference degrading two center RBs, which are equivalent to one-third of the subcarriers of a full allocation in a 1.4 MHz (6 RB) system. Quadrature phase shift keying (QPSK) modulation, a ⅓ code, additive white Gaussian noise (AWGN), and an SNR of $SNR_{full}$=−3.86 dB were assumed. The signal-to-interference ratio (SIR) of the interfered-with RBs is constant for each curve. In FIG. 4A, the curves are as follows, starting from the top left-hand side and moving toward the bottom right: SIR=60 dB (no interference) (points indicated by circles); SIR=0 dB (points indicated by squares); SIR=−3 dB (points indicated by diamonds); SIR=−6 dB (points indicated by x-es); and SIR=−9 dB (points indicated by asterisks).

Figure 4B:
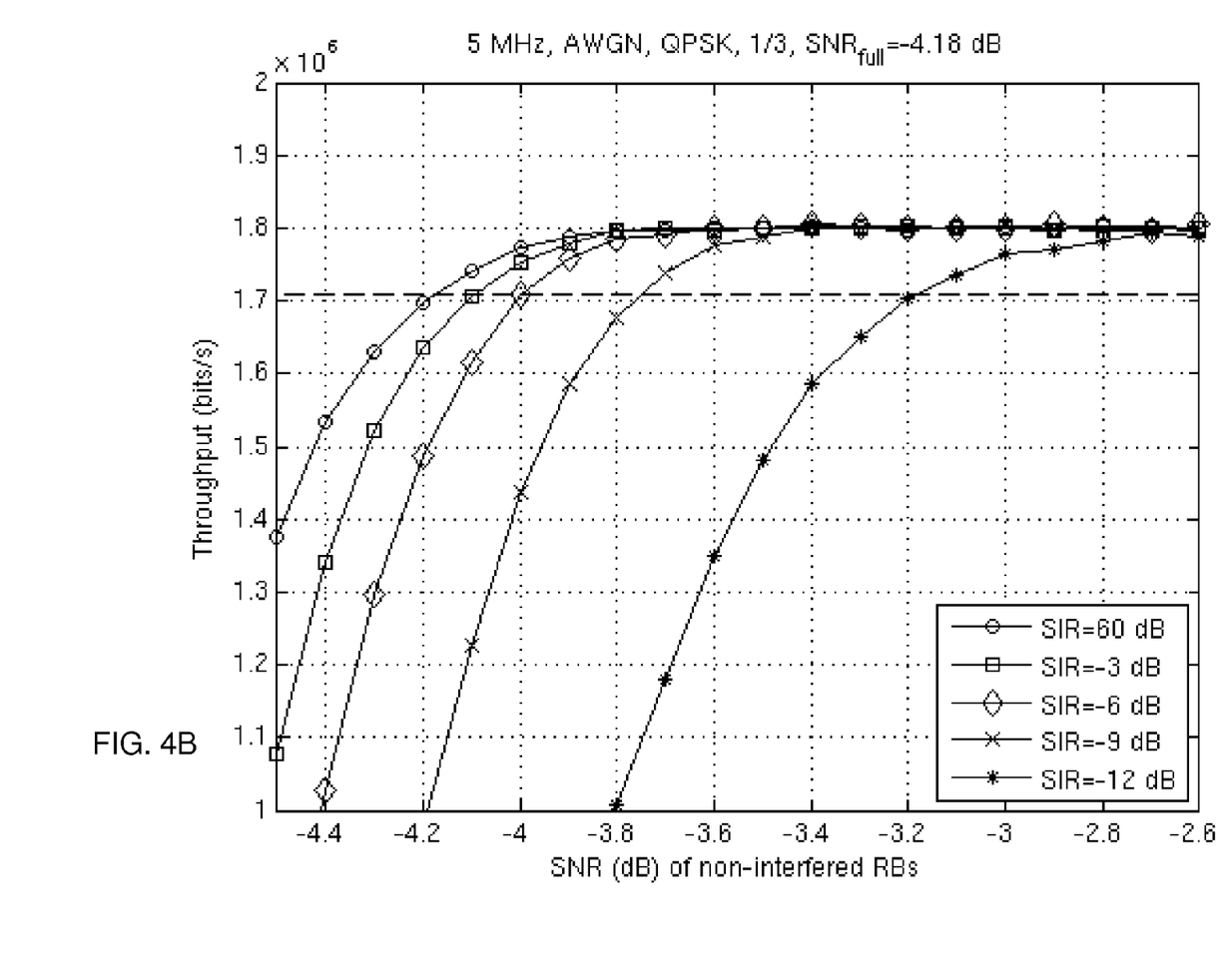

FIG. 4B is another plot of simulated throughput against SNR for an example where the full allocation is 15 RBs in a 5 MHz system. As in FIG. 4A, FIG. 4B shows the effect of degrading two center RBs, with assumed QPSK modulation, a ⅓ code, AWGN, and an SNR of $SNR_{full}$=−4.18 dB. The SIR of the interfered-with RBs is constant for each curve, and the curves are as follows, starting from the top left-hand side and moving toward the bottom right: SIR=60 dB (no interference) (points indicated by circles); SIR=−3 dB (points indicated by squares); SIR=−6 dB (points indicated by diamonds); SIR=−9 dB (points indicated by x-es); and SIR=−12 dB (points indicated by asterisks). In FIG. 4B, the larger allocation corresponds to a larger P, which reduces the ratio 2Q/P and so the effects of self-interference, as can see by comparing same SIR levels in FIGS. 4A, 4B. The variables P and Q are discussed in more detail below.

As can be seen in FIG. 4, the effect of leakage, which lowers the SIR for the interfered-with RBs, is most severe when the UL transmission is noise-limited because then the UE transmits with its maximum power. Furthermore, the noise floor drops if the number of allocated RBs in the UL is increased, if the total transmit power is kept constant, because the transmit power is spread out over more RBs, i.e., the power spectral density is decreased.

In accordance with this invention, RB positions and MCS are assigned by an eNodeB based on one or more of UL allocation bandwidth, UL transmit power, DL allocation bandwidth, and initial MCS (e.g., based on UE reports of channel quality indicator (CQI) only). All of those parameters used for modifying a resource assignment are known a priori by an eNodeB from conventional signaling specified for an LTE or other communication system. It will be understood that in many cases, the UE's UL transmit power is not completely known by an eNodeB because the eNodeB simply sends power up/down commands to the UE but generally does not know the UE's power limit.

For example, a UE that transmits at full output power over a single RB causes the worst self-induced interference at ±1 RB (i.e., Q=1) around d.c. Given a small DL assignment, e.g., P RBs, where P is a small integer, two RBs out of the P RBs that cover the RBs around d.c. will experience an increased noise level. As 2Q/P approaches unity from above, the average SNR taken over the whole DL allocation gradually but severely decreases. Similarly, the MCS, which is chosen for a target block error rate (BLER) (usually around 10%), also gradually becomes inappropriate, and so the BLER gradually increases. Other examples involving combinations of UL allocation bandwidth (e.g., Q RBs, where Q is an integer greater than unity) and transmit power, as well as DL allocation bandwidth and MCS, can be described in similar fashion. In general, the fraction of interfered-with RBs approaches 2Q/P, and the decrease of the average SNR is a function of the UL transmit power.

A suitable goal of resource assignment is to cause no more than some target degradation in UE SNR or SIR, e.g., 5% as shown by FIG. 4. In general, it is difficult to describe the functional relationships between degradation and each of UL allocation bandwidth, UL transmit power, DL allocation bandwidth, and initial MCS with solvable equations. Nevertheless, the effect of UL transmit power can be modeled through the SIR, e.g., lower SIR corresponds to higher UL transmit power. The ratio 2Q/P can be used advantageously for estimating expected self-interference, i.e., "how many P RBs experience degradation?". MCS is important, too, where strong coding, i.e., low coding rate, means more robustness given a combination of SIR and 2Q/P.

Figure 5:
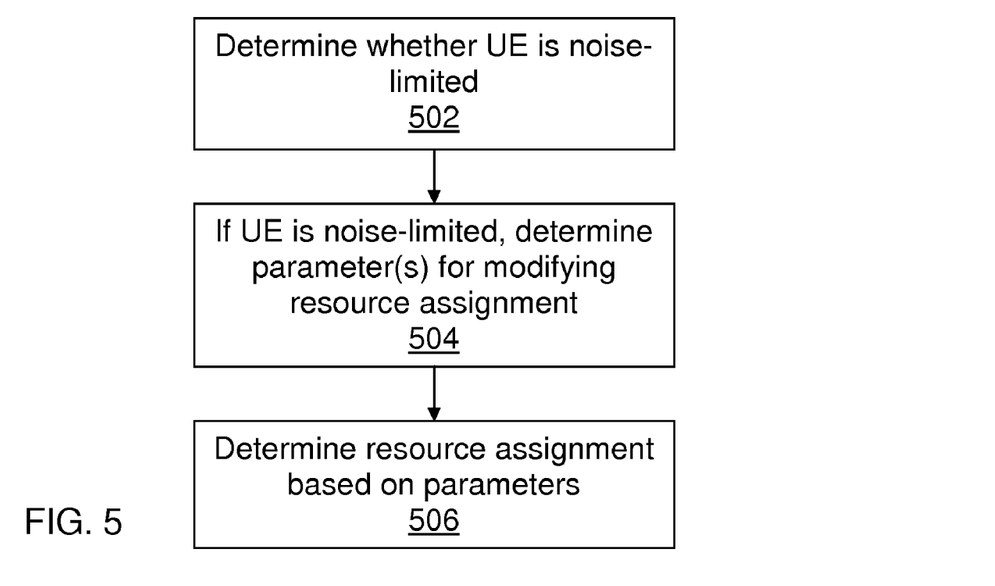
FIG. 5 is a flow chart of a method of assigning resources.

FIG. 5 is a flow chart of a method of assigning resources to a UE as described above. eNodeBs should schedule UEs that are close to noise-limited in the UL such that DL-scheduled RBs are not within d.c. plus or minus the bandwidth of scheduled UL transmissions, and so in step 502, an eNodeB determines whether a UE is or is substantially noise-limited, for example, based on CQI reports by the UE and/or by observing the UE's response to power-up commands. If the SNR does not increase after the eNodeB commands the UE to increase its transmit power, the eNodeB can conclude that the UE is noise-limited. In step 504, the eNodeB determines one or more of the UE's UL allocation bandwidth, UL transmit power, DL allocation bandwidth, and initial MCS, which are parameters on which the eNodeB bases its resource assignment (step 506). For example, an eNodeB can also determine the initial MCS based on CQI reports and response to transmit power control commands by the UE.

If it is not possible for the eNodeB to do DL and UL scheduling such that the DL RBs are unaffected by UL leakage in the UE, the eNodeB can compensate for the possible increase in the noise level for the central DL RBs by adjusting the MCS of its DL transmission. This adjustment can be based on UL allocation size and transmit power, and in general can be carried out in a step-wise fashion, i.e., NO adjust below certain thresholds of UL allocation and transmit power and then FULL adjust above those thresholds, or in a smoother fashion, i.e., proportional to allocation and power. It will also be appreciated that resource assignment can be based on the parameters even when the UE is not noise-limited or close to it.

Applying the techniques described in this application, a UE in an FDD communication system can have more relaxed requirements for its duplex filter. System performance becomes more predictable because different UE implementations, e.g., UEs that estimate and cancel interference and UEs that do not, behave approximately the same as the level of interference is controllable by advanced eNodeB DL/UL scheduling. Furthermore, the linearity requirement on a UE's transmit path can be relaxed, which in turn reduces UE implementation cost and power consumption.

Figure 6:
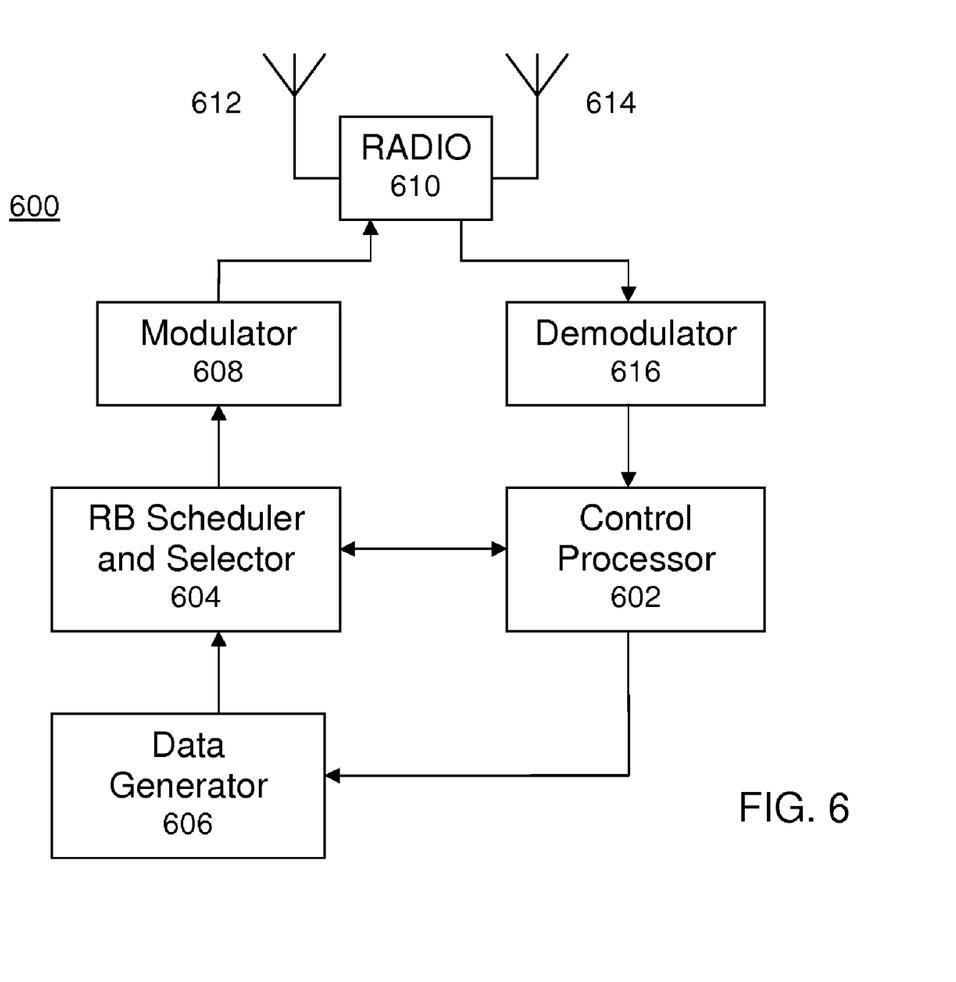
FIG. 6 is a block diagram of a portion of a base station in a cellular communication system.

FIG. 6 is a block diagram of a portion of an eNodeB 500, which is typical of the BSs 16, 18, 20, 22, 24 and other such transmitting nodes in the network 10, that can communicate with UEs by implementing the methods described above. It will be appreciated that the functional blocks depicted in FIG. 6 can be combined and re-arranged in a variety of equivalent ways, and that many of the functions can be performed by one or more suitably programmed digital signal processors and other known electronic circuits.

The eNodeB 600 is operated by a control processor 602, which typically and advantageously is a suitably programmed digital signal processor. The control processor 602 typically provides and receives control and other signals from various devices in the eNodeB 600. For simplicity in FIG. 6, the control processor 602 is shown exchanging information with a RB scheduler and selector 604, which receives digital words to be transmitted from a suitable data generator 606.

Information from the scheduler and selector 604 is provided to an OFDM modulator 608, and the modulation signal generated by the modulator 608 is provided to a suitable radio 610 that generates a wireless signal that is transmitted to a UE through a transmit antenna 612. Wireless signal transmitted by UEs are captured by a receive antenna 614 that provides those signals to the radio 610 and a demodulator 616.

The artisan will understand that more than one transmit antenna can be provided. It will also be understood that the control processor 602 can be configured such that it includes one or more other devices depicted in FIG. 6, which can be implemented by dedicated programmed processors or other suitable logic configured to perform their functions. The combination of the data generator 606, scheduler and selector 604, and modulator 608 produces DL subframes to be transmitted. The modulator 608 converts the information into modulation symbols that are provided to the OFDM radio 610, which impresses the modulation symbols on suitable subcarrier signals. The modulated subcarrier signals are transmitted through the antenna 612.

It will be appreciated that procedures described above are carried out repetitively as necessary, for example, to respond to the time-varying nature of communication signals exchanged by transmitters and receivers.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless transceivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method in a frequency division duplex communication system of assigning resources in a downlink (DL) to a user equipment (UE), comprising:
   determining at least one parameter for a DL resource assignment, wherein the at least one parameter is at least one of an uplink (UL) allocation bandwidth, an UL transmit power, a DL allocation bandwidth, and an initial modulation and coding scheme (MCS); and
   basing the DL resource assignment on the determined at least one parameter such that DL-scheduled resource blocks are not spectrally within zero frequency plus or minus a bandwidth of a scheduled UL transmission.

2. The method of claim 1, further comprising, if it is not possible to base the DL resource assignment such that DL-scheduled resource blocks are not spectrally within zero frequency plus or minus a bandwidth of a scheduled UL transmission, adjusting the MCS of the DL resource assignment as compensation.

3. The method of claim 2, wherein the MCS is adjusted based on at least one of UL allocation size and transmit power.

4. The method of claim 1, further comprising determining whether the UE is substantially noise-limited in the UL, wherein the at least one parameter for the DL resource assignment is determined if the UE is substantially noise-limited in the UL.

5. The method of claim 4, wherein whether the UE is substantially noise-limited in the UL is determined based on at least one of UE channel quality indicator reports and UE response to power-up commands.

6. An apparatus in a frequency division duplex communication system for assigning resources in a downlink (DL) to a user equipment (UE), comprising:
   a electronic processor configured to determine at least one parameter for a DL resource assignment, wherein the at least one parameter is at least one of an uplink (UL) allocation bandwidth, an UL transmit power, a DL allocation bandwidth, and an initial modulation and coding scheme (MCS), and the electronic processor is further configured to base the DL resource assignment on the determined at least one parameter such that DL-scheduled resource blocks are not spectrally within zero frequency plus or minus a bandwidth of a scheduled UL transmission.

7. The apparatus of claim 6, wherein the electronic processor is configured, if it is not possible to base the DL resource assignment such that DL-scheduled resource blocks are not spectrally within zero frequency plus or minus a bandwidth of a scheduled UL transmission, to adjust the MCS of the DL resource assignment as compensation.

8. The apparatus of claim 7, wherein the MCS is adjusted based on at least one of UL allocation size and transmit power.

9. The apparatus of claim 6, wherein the electronic processor is further configured to determine whether the UE is substantially noise-limited in the UL, and the at least one parameter for the DL resource assignment is determined if the UE is substantially noise-limited in the UL.

10. The apparatus of claim 9, wherein whether the UE is substantially noise-limited in the UL is determined based on at least one of UE channel quality indicator reports and UE response to power-up commands.

11. A non-transitory computer-readable medium having stored instructions that, when executed by a computer, cause the computer to perform a method in a frequency division duplex communication system of assigning resources in a downlink (DL) to a user equipment (UE), wherein the method comprises:
    determining at least one parameter for a DL resource assignment, wherein the at least one parameter is at least one of an uplink (UL) allocation bandwidth, an UL transmit power, a DL allocation bandwidth, and an initial modulation and coding scheme (MCS); and
    basing the DL resource assignment on the determined at least one parameter such that DL-scheduled resource blocks are not spectrally within zero frequency plus or minus a bandwidth of a scheduled UL transmission.

12. The non-transitory medium of claim 11, wherein the method further comprises, if it is not possible to base the DL resource assignment such that DL-scheduled resource blocks are not spectrally within zero frequency plus or minus a bandwidth of a scheduled UL transmission, adjusting the MCS of the DL resource assignment as compensation.

13. The non-transitory medium of claim 12, wherein the MCS is adjusted based on at least one of UL allocation size and transmit power.

14. The non-transitory medium of claim 11, wherein the method further comprises determining whether the UE is substantially noise-limited in the UL, wherein the at least one parameter for the DL resource assignment is determined if the UE is substantially noise-limited in the UL.

15. The non-transitory medium of claim 14, wherein whether the UE is substantially noise-limited in the UL is determined based on at least one of UE channel quality indicator reports and UE response to power-up commands.

* * * * *

UNITED STATES PATENT AND TRADEMARK OFFICE
CERTIFICATE OF CORRECTION

PATENT NO. : 8,331,254 B2
APPLICATION NO. : 12/642027
DATED : December 11, 2012
INVENTOR(S) : Kamuf et al.

It is certified that error appears in the above-identified patent and that said Letters Patent is hereby corrected as shown below:

In the Specifications:

In Column 6, Line 59, delete "2Q/P," and insert -- 2Q/P, --, therefor.

Signed and Sealed this
Sixteenth Day of April, 2013

Teresa Stanek Rea
*Acting Director of the United States Patent and Trademark Office*